(12) United States Patent
Miao et al.

(10) Patent No.: US 11,080,834 B2
(45) Date of Patent: Aug. 3, 2021

(54) IMAGE PROCESSING METHOD AND ELECTRONIC DEVICE

(71) Applicant: Ping An Technology (Shenzhen) Co., Ltd., Shenzhen (CN)

(72) Inventors: Jinghong Miao, San Jose, CA (US); Yuchuan Gou, Sunnyvale, CA (US); Bo Gong, Belmont, CA (US); Mei Han, Palo Alto, CA (US)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 115 days.

(21) Appl. No.: 16/727,791

(22) Filed: Dec. 26, 2019

(65) Prior Publication Data
US 2021/0201456 A1 Jul. 1, 2021

(51) Int. Cl.
*G06T 5/50* (2006.01)
*G06F 17/16* (2006.01)
*G06N 3/04* (2006.01)

(52) U.S. Cl.
CPC .......... *G06T 5/50* (2013.01); *G06F 17/16* (2013.01); *G06N 3/04* (2013.01)

(58) Field of Classification Search
CPC .......... G06T 5/50; G06F 17/16; G06N 3/04
See application file for complete search history.

(56) References Cited

U.S. PATENT DOCUMENTS

| | | | |
|---|---|---|---|
| 10,552,977 B1* | 2/2020 | Theis | G06K 9/00228 |
| 10,657,676 B1* | 5/2020 | Rehfeld | G06N 3/0472 |
| 10,685,057 B1* | 6/2020 | Chavez | G06N 3/08 |
| 10,916,001 B2* | 2/2021 | Lu | G06T 11/00 |
| 2018/0068463 A1* | 3/2018 | Risser | G06T 7/45 |
| 2018/0093180 A1* | 4/2018 | Yamanokuchi | A63F 13/822 |
| 2018/0373999 A1* | 12/2018 | Xu | G06K 9/00765 |
| 2019/0026870 A1* | 1/2019 | Hu | G06T 11/00 |
| 2019/0213705 A1* | 7/2019 | Kamath | G06N 3/0454 |
| 2019/0220746 A1* | 7/2019 | Liu | G06K 9/6262 |
| 2019/0228264 A1* | 7/2019 | Huang | G06K 9/4628 |
| 2019/0236814 A1* | 8/2019 | Shlens | G06K 9/6256 |
| 2019/0325628 A1* | 10/2019 | Dubey | G06F 16/3329 |
| 2020/0134797 A1* | 4/2020 | Zhang | G06T 5/009 |
| 2020/0202111 A1* | 6/2020 | Yuan | G06K 9/00288 |
| 2020/0202502 A1* | 6/2020 | Tsymbalenko | G06T 5/50 |
| 2020/0258204 A1* | 8/2020 | Fang | G06T 3/0012 |

(Continued)

OTHER PUBLICATIONS

Atarsaikhan, G., et al., "Constrained Neural Style Transfer for Decorated Logo Generation", arXiv.org, Jul. 2018.*

(Continued)

*Primary Examiner* — Xuemei G Chen
(74) *Attorney, Agent, or Firm* — ScienBiziP, P.C.

(57) ABSTRACT

An image processing method and an electronic device are provided, the method extracts a first object mask of a texture image and a second object mask of a to-be-optimized image. An image recognition model is used to obtain a first content matrix, a first texture matrix, a second content matrix, a second texture matrix, a first mask matrix, and a second mask matrix. A total loss of the to-be-optimized image is determined, and the total loss is minimized by adjusting a value of each pixel of the to-be-optimized image, thereby an optimized image is obtained. By utilizing the image processing method, quality of final image is improved.

20 Claims, 6 Drawing Sheets

(56) References Cited

U.S. PATENT DOCUMENTS

| | | | |
|---|---|---|---|
| 2020/0286273 A1* | 9/2020 | Chen | G06N 3/08 |
| 2020/0311986 A1* | 10/2020 | Tong | G06T 11/001 |
| 2020/0327709 A1* | 10/2020 | Liu | G06K 9/6262 |
| 2021/0012181 A1* | 1/2021 | Zhu | G06T 7/10 |
| 2021/0049403 A1* | 2/2021 | Pan | G06K 9/46 |
| 2021/0063518 A1* | 3/2021 | Zhang | G06K 9/46 |
| 2021/0118112 A1* | 4/2021 | Huang | G06T 11/00 |
| 2021/0142454 A1* | 5/2021 | Kubendran | G06T 7/90 |
| 2021/0142455 A1* | 5/2021 | Hsiao | G06T 5/50 |

OTHER PUBLICATIONS

Gatys, L., et al., "Image Style Transfer Using Convolutional Neural Networks", 2016 IEEE Conference on Computer Vision and Pattern Recognition (CVPR), Jun. 2016.*

* cited by examiner

IMAGE PROCESSING METHOD AND ELECTRONIC DEVICE

FIELD

Embodiments of the present disclosure relate to technical fields of image processing, specifically to an image processing method and an electronic device.

BACKGROUND

With the development of deep learning and the advancement of computer vision, image modification and image synthesis have become a very popular field. Generally, two algorithms of texture conversion and texture generation and the like may extract content information of an image, and then modify the image. However, it is impossible to control conversion contents and a conversion position of an output image, which inevitably leads to some undesirable results appearing in a composite image, such as object distortion and content duplication, for example. Thus, the composite image presents a poor image.

DETAILED DESCRIPTION

In order to enable those skilled in the art to better understand the solution of the present disclosure, the technical solutions in the embodiments of the present disclosure will be described below with reference to drawings in the embodiments of the present disclosure. Obviously, described embodiments are merely embodiments which are a part of the present disclosure, rather than every embodiment. All other embodiments obtained by those of ordinary skill in the art based on the embodiments of the present disclosure without creative efforts should be within the scope of the present disclosure.

Terms such as "first", "second" in the specification and claims of the present disclosure and the above drawings are used to distinguish different objects, and are not intended to describe a specific order. Moreover, terms "include" and any variations of the "include" are intended to indicate a non-exclusive inclusion. For example, a process, a method, a system, a product, or a device which includes a series of steps or units is not limited to listed steps or units, but optionally, also includes steps or units not listed, or optionally, also includes other steps or units inherent to these processes, methods, products, or equipment.

Figure 1:
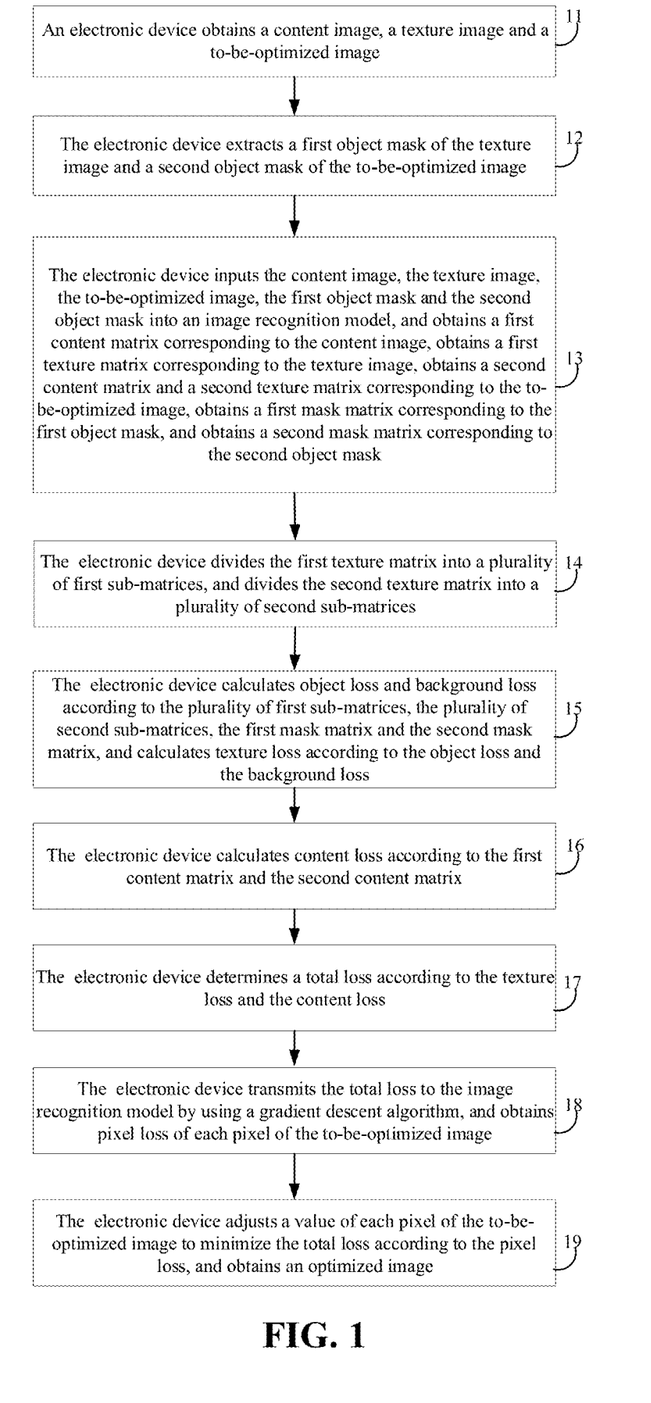
FIG. 1 is a flowchart of one embodiment of an image processing method.

FIG. 1 is a flowchart of one embodiment of an image processing method. Depending on the embodiment, additional operations may be added, others may be removed, and the ordering of blocks may be changed.

In block 11, an electronic device obtains a content image, a texture image, and a to-be-optimized image.

In one embodiment, contents of the to-be-optimized image are consistent with contents of the content image. The to-be-optimized image is an image that needs to be texture-converted according to the texture image.

The electronic device can automatically perform numerical calculations and/or information processing according to instructions preset or stored in advance, and hardware of the electronic device includes, but is not limited to, a microprocessor, an application specific integrated circuit (ASIC), and field programmable gate arrays (FPGAs), digital signal processors (DSPs), embedded devices, and more. The electronic device may also include a network device and/or a user equipment.

The network device includes, but is not limited to, a single network server, a server group including a plurality of network servers, or a cloud made up of a large number of hosts or network servers. The user equipment includes, but is not limited to, any electronic product that can interact with a user through a keyboard, a mouse, a remote controller, a touch pad, or a voice control device, such as a personal computer, a tablet computer, a smart phone, a personal digital device, and Personal Digital Assistant (PDA), for example.

In block 12, the electronic device extracts a first object mask of the texture image and a second object mask of the to-be-optimized image.

The first object mask of the texture image and the second object mask of the to-be-optimized image may be extracted in various ways. The various manners may include a manual drawing manner by using masking software, or an automatic generation manner by utilizing some pre-trained models.

The first object mask can draw an object outline of the texture image, and the first object mask can distinguish which part of the texture image belongs to an object area, and which part belongs to a background area. Similarly, the second object mask can draw an object outline of the to-be-optimized image, and the second object mask can distinguish which part of the to-be-optimized image belongs to an object area, and which part belongs to a background area.

In block 13, the electronic device inputs the content image, the texture image, the to-be-optimized image, the first object mask, and the second object mask into an image recognition model, and obtains a first content matrix corresponding to the content image, a first texture matrix corresponding to the texture image, a second content matrix and a second texture matrix corresponding to the to-be-optimized image, a first mask matrix corresponding to the first object mask, and a second mask matrix corresponding to the second object mask.

In one embodiment, the image recognition model is a Visual Geometry Group Network (VGG) series model, the image recognition model includes VGG16 model or VGG19 model.

In one embodiment, the content image may be input into the image recognition model, and a matrix, which is denoted as the first content matrix corresponding to the content image, is output by a content layer of the image recognition model, the content layer uses Relu31 function. The texture image may be input into the image recognition model, and a matrix, which is denoted as the first texture matrix corresponding to the texture image, is output by a texture layer of the image recognition model, the texture layer uses Relu41 function. The first object mask of the texture image may be input into the image recognition model, and a matrix, which is denoted as the first mask matrix, is output by the texture layer of the image recognition model. In one embodiment, the first mask matrix can be a high dimensional matrix of 0 and 1, where 0 is the background area in the texture image, and 1 represents the object area in the texture image.

The to-be-optimized image may be input into the image recognition model, and a matrix, which is denoted as the second content matrix corresponding to the to-be-optimized image, is output by the content layer of the image recognition model, and a matrix, which is denoted as the second texture matrix corresponding to the to-be-optimized image, is output by the texture layer of the image recognition model. The second object mask of the to-be-optimized image may be input into the image recognition model, and a matrix, which is denoted as the second mask matrix, is output by the texture layer of the image recognition model. In one embodiment, the second mask matrix can be a high dimensional matrix of 0 and 1, where 0 represents the background area in the to-be-optimized image, and 1 represents the object area in the to-be-optimized image.

In block 14, the electronic device divides the first texture matrix into a plurality of first sub-matrices and the second texture matrix into a plurality of second sub-matrices.

A size of each sub-matrix may be preset. According to the preset size, the first texture matrix is divided into a plurality of first sub-matrices having the same size, and the second texture matrix is also divided into a plurality of second sub-matrices having the same size.

In one embodiment, the first content matrix may be defined as $\Phi^c(x_c)$, the second content matrix may be defined as $\Phi^c(x)$, the first texture matrix may be defined as $\Phi^s(x_s)$, and the second texture matrix may be defined as $\Phi^s(x)$. The $\Phi^s(x_s)$ and the $\Phi^s(x)$ can be divided into a plurality of small matrices along the H, W space. For example, a matrix of H*W*C is divided into (H−3)×(w−3) small matrices of 3*3*C every 3 pixels, and a division of the i-th $\Phi^s(x_s)$ is represented as $\Psi_i(\Phi^s(x_s))$ (e.g., the first sub-matrix). Similarly, a division of i-th $\Phi^s(x)$ is represented as $\Psi_i(\Phi^s(x))$ (e.g., the second sub-matrix).

In block 15, the electronic device calculates object loss and background loss according to the plurality of first sub-matrices, the plurality of second sub-matrices, the first mask matrix, and the second mask matrix, and calculates texture loss according to the object loss and the background loss.

According to the first mask matrix, the plurality of first sub-matrices is divided into two parts: a matrix belonging to an object area and a matrix belonging to a background area. Similarly, according to the second mask matrix, the plurality of second sub-matrices is divided into two parts: a matrix belonging to an object area and a matrix belonging to a background area.

The object loss is calculated by performing a difference calculation between the matrix belonging to the object area of the plurality of first sub-matrices and the matrix belonging to the object area of the plurality of second sub-matrices. The background loss is calculated by performing a logical AND calculation between the matrix belonging to the background area of the plurality of first sub-matrices and the matrix belonging to the background area of the plurality of second sub-matrices.

In one embodiment, calculations are made as to the object loss and the background loss according to the plurality of first sub-matrices, the plurality of second sub-matrices, the first mask matrix, and the second mask matrix.

In one embodiment, a method of calculating the object loss and the background loss according to the plurality of first sub-matrices, the plurality of second sub-matrices, the first mask matrix, and the second mask matrix includes: determining sub-matrices in an object area of the plurality of first sub-matrices as a first object matrix, and sub-matrices in a background area of the plurality of first sub-matrices as a first background matrix, based on the first mask matrix; determining sub-matrices in an object area of the plurality of second sub-matrices as a second object matrix, and sub-matrices in a background area of the plurality of second sub-matrices as a second background matrix, based on the second mask matrix; calculating the object loss according to the first object matrix and the second object matrix; calculating the background loss according to the first background matrix and the second background matrix.

In one embodiment, the image processing method further includes: calculating the texture loss according to a formula of:

$$E_{style} = \Sigma_{n=1}^2 \Sigma_{i=1}^{mn}(\Psi_i(\Phi^s(x_n)) - (\Psi_{N_nN_n(i)}(\Phi^s(x_{ns}))))^2.$$

Where $E_{style}$ represents the texture loss, $\Psi_i(\Phi^s(x_1))$ represents the first object matrix, $\Psi_{N_1N_1(i)}(\Phi^s(x_{1s}))$ represents the second object matrix, $\Psi_i(\Phi^s(x_2))$ represents the first background matrix, and $\Psi_{N_2N_2(i)}(\Phi^s(x_{2s}))$ represents the second background matrix.

$N_nN_n(i)$ represents an index value of the second object matrix or the second background matrix, an angular distance between the second object matrix or the second background matrix and $\Psi_i(\Phi^s(x_n))$ is the smallest distance.

$$N_nN_n(i) = \arg\min_{j=1,\ldots mn_s} \frac{\Psi_i(\Phi^s(x_n)) * \Psi_j(\Phi^s(x_{ns}))}{|\Psi_i(\Phi^s(x_n))| * |\Psi_j(\Phi^s(x_{ns}))|}.$$

And $mn_s$ represents a number of the second sub-matrices.

This embodiment is applicable to a single mask. After the first object matrix and the second object matrix are obtained, the first object matrix may be compared with the second object matrix, to obtain a difference (e.g., the object loss). After the first background matrix and the second background matrix are obtained, the first background matrix may be compared with the second background matrix, to obtain a difference (e.g., the background loss). Finally a sum of the object loss and the background loss may be determined to be the texture loss.

In another embodiment, where there are a plurality of the first object masks and a plurality of the second object masks, object types represented by the plurality of the first object masks are the same as object types represented by the plurality of the second object masks.

Each of the object masks represents an object type. For example, a first object mask may be a mask representing a first object type (e.g., a flower) in a texture image, or the first object mask may be a mask representing a second object type (e.g., a vase) in the texture image. A second object mask may be a mask representing the first object type (e.g., a flower) in a to-be-optimized image, or the second object mask may be a mask representing the second object type (e.g., a vase) in the to-be-optimized image. Object types represented by the first object mask are the same as object types represented by the second object mask. For example, the first object mask can represent two object types: a flower and a vase, and the second object mask also represents two object types: a flower and a vase.

In one embodiment, the number of the object types represented by the object masks may also be three, four, or more, which is not limited in the embodiments of the present disclosure. After each of the object masks is input to the image recognition model, a mask matrix corresponding to the object mask is obtained. Accordingly, under the condition that there are a plurality of object masks, a plurality of mask matrices can be generated, and the number of the first object masks is the same as the number of the second object masks, and the number of the first mask matrices is also the same as the number of the second mask matrices.

In one embodiment, the calculation of the object loss and the background loss according to the plurality of first sub-matrices, the plurality of second sub-matrices, the first mask matrix, and the second mask matrix, and the calculation of the texture loss according to the object loss and the background loss includes: determining sub-matrices in an object area of the plurality of first sub-matrices as a first object matrix, and sub-matrices in a background area of the plurality of first sub-matrices as a first background matrix, according to the first mask matrices; determining sub-matrices in an object area of the plurality of second sub-matrices as a second object matrix, and sub-matrices in a background area of the plurality of second sub-matrices as a second background matrix, according to the second mask matrices; determining the object types represented by the plurality of the first object masks and the plurality of the second object masks; calculating the object loss corresponding to each of the object types according to the first object matrix and the second object matrix corresponding to the each of the object types; calculating the background loss according to the first background matrix and the second background matrix; calculating the texture loss according to the object loss corresponding to all of the object types and the background loss.

The above embodiment is applicable to a plurality of masks. When calculating the object loss, it is necessary to separately calculate an object loss corresponding to each object type according to the object type. Taking two masks as an example, the two masks correspond to two object types, and the texture loss can be calculated using a formula of:

$$E_{style} = \rho_{n=1}^{3} \Sigma_{i=1}^{mn} (\Psi_i(\Phi^2(x_n)) - \Psi_{N_n N_n(i)}(\Phi^s(x_{ns})))^2.$$

Where $E_{style}$ represents the texture loss, and when n is equal to 1 or 2, $\Psi_i(\Phi^s(x_n))$ represents two first object matrices, including the first object matrix representing the first object type and the first object matrix representing the second object type. $\Psi_{N_n N_n(i)}(\Phi^s(x_{ns}))$ represents two second object matrices, including the second object matrix representing the first object type and the second object matrix representing the second object type. When n is equal to 3, $\Psi_i(\Phi^s(x_3))$ represents the first background matrix, and $\Psi_{N_3(i)}(\Phi^s(x_{3s}))$ represents the second background matrix.

$N_n N_n(i)$ represents an index value of the second object matrix or the second background matrix, an angular distance between the second object matrix or the second background matrix and $\Psi_i(\Phi^s(x_n))$ is the smallest distance.

$$N_n N_n(i) = \mathrm{argmin}_{j=1,\ldots mn_s} \frac{\Psi_i(\Phi^s(x_n)) * \Psi_j(\Phi^s(x_{ns}))}{|\Psi_i(\Phi^s(x_n))| * |\Psi_j(\Phi^s(x_{ns}))|}.$$

And $mn_s$ represents the number of the second sub-matrices.

In one embodiment, under the condition that there are a plurality of the texture images, the image processing method further includes: saving, for each of the object types, a plurality of first object matrices corresponding to the plurality of the texture images as a model format file; establishing a texture database according to the model format files corresponding to all of the object types.

In one embodiment, a texture conversion algorithm is utilized to perform a calculation between sub-matrices of the to-be-optimized image and sub-matrices of the texture image, and the texture conversion algorithm is not directly utilized to perform a calculation between the to-be-optimized image and the texture image. Therefore, it is more straightforward to store sub-matrices than to store images, and the computational time in conversion can be reduced significantly, no result of all output layers is needed, and the memory space is saved.

In one embodiment, the texture database can be a model format file, and there is no entire image. The plurality of first object matrices corresponding to an object type can be saved as a model format file. A number of the model format files are the same as a number of the object types. When a new texture image needs to be added into the texture database, a similar method as described above can be performed to input the new texture image into the image recognition model, and a new sub-matrix is added into the model format file of the texture database.

When a new to-be-optimized image is processed later, the model format file can be directly obtained from the texture database, thus, a diversity of generated result images is increased. Since images generated by texture conversion are based on a plurality of the texture images in the texture database, the generated result image would not be very similar to a texture image. In addition, since the texture database is pre-calculated by the image recognition model, the texture conversion algorithm can directly use the pre-calculated results without recalculation in the process of texture conversion, thus, image generation time can be reduced and image processing efficiency is improved.

In block 16, the electronic device calculates content loss according to the first content matrix and the second content matrix.

In one embodiment, the content loss can be calculated using a formula of:

$$E_{content} = (\Phi^c(x) - \Phi^c(x_c))^2.$$

Where $E_{content}$ represents the content loss, $\Phi^c(x)$ represents the second content matrix, and $\Phi^c(x_c)$ represents the first content matrix.

In block 17, the electronic device determines a total loss according to the texture loss and the content loss.

The total loss can be calculated using a formula of:

$$E = E_{content} + E_{style}$$

Where E represents the total loss, $E_{content}$ represents the content loss, and $E_{style}$ represents the texture loss.

The total loss is a calculated initial value, and during image processing, the total loss also needs to be continuously optimized until convergence.

In block 18, the electronic device transmits the total loss to the image recognition model by using a gradient descent algorithm, and obtains pixel loss of each pixel of the to-be-optimized image.

In block 19, the electronic device adjusts a value of each pixel of the to-be-optimized image to minimize the total loss according to the pixel loss, and obtains an optimized image.

In the process of optimization, a gradient descent algorithm (e.g., Stochastic Gradient Descent) may be used to transmit the total loss to the image recognition model, and pixel loss of each pixel of the to-be-optimized image can be obtained. According to the pixel loss, value of each pixel of the to-be-optimized image is adjusted to minimize the total loss, and an optimized image is obtained. The purpose of transmitting the total loss to the image recognition model is to adjust the value of each pixel of the to-be-optimized image.

In the process of optimizing the total loss, the content loss may gradually increase from 0, and the texture loss may gradually decrease correspondingly. When a sum (e.g., the total loss) of the content loss and the texture loss is the smallest, and the to-be-optimized image is finished optimizing, an optimized image is obtained.

The optimized image shows contents of the content image and texture of the texture image.

By use of a mask, the calculation of an object area of the optimized image is based on an object area of the texture image, and the calculation of background area of the optimized image is based on background area of the texture image. Therefore, the pixel isolation in the space is guaranteed, so that the optimized image has more orientation.

In terms of area controls of a texture conversion, the present disclosure uses a mask to artificially control an area selection of texture conversion, thus accuracy and speed can be freely switched. The image recognition model generated by the mask definition is compared to an original texture generation model, the image recognition model is better in content control, the optimized image based on the image recognition model has less redundant content, less computational resource is needed for the computing, and it can be calculated in parallel. Compared to the original texture generation model, the image recognition model can produce more accurate and more satisfactory images.

Figure 2:
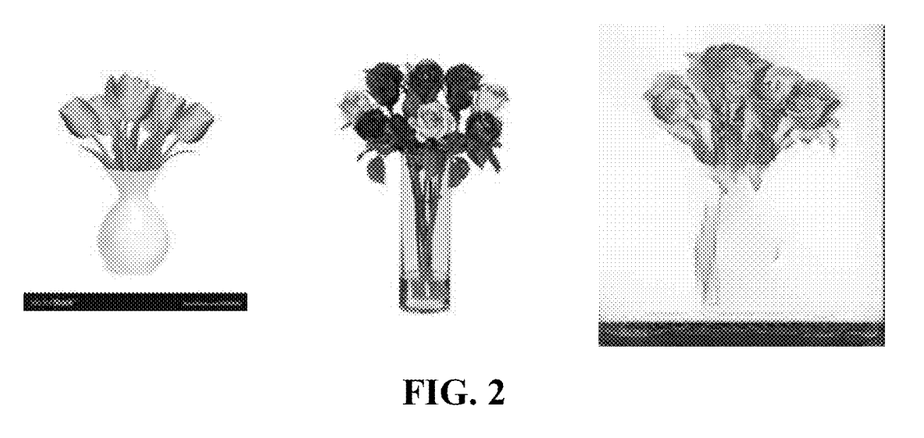
FIG. 2 is photographic images of one embodiment of image processing results without using a mask.

FIG. 2 is photographic images of one embodiment of image processing results without using a mask.

As shown in FIG. 2, from left to right, there are a content image, a texture image, and an optimized image shown in turn. In one embodiment of images shown in FIG. 2, no mask is used during image processing. As an object area is not controlled, the optimized image has poor image effect.

Figure 3:
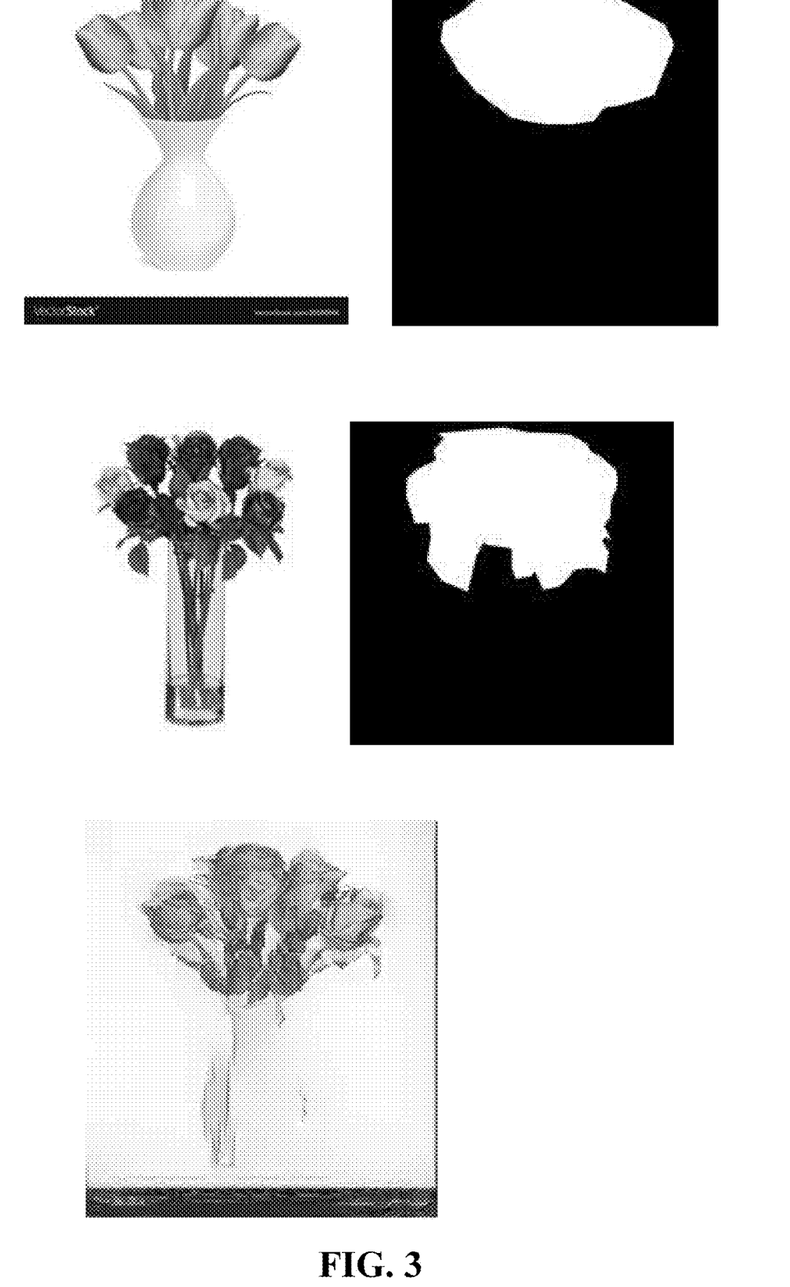
FIG. 3 is photographic images of one embodiment of image processing results using a single mask.

FIG. 3 is photographic images of one embodiment of image processing results using a single mask.

As shown in FIG. 3, from top to bottom, there are a content image and a mask of the content image, a texture image and a mask of the texture image, and an optimized image are shown in turn. A single mask is applied to FIG. 3, and the single mask represents an object type (e.g., a flower) in FIG. 3, a white part of the single mask represents a part where a flower is located.

Figure 4:
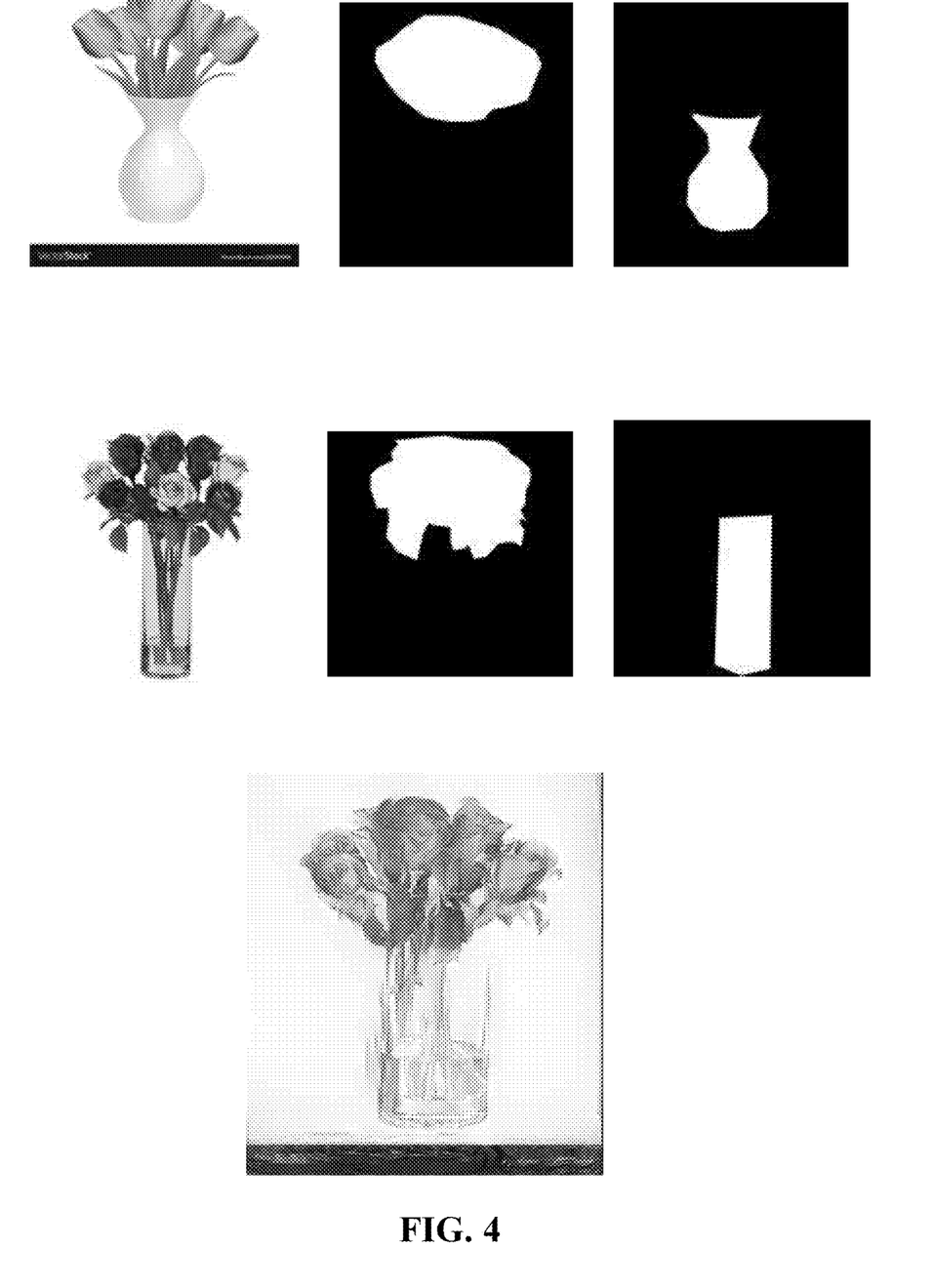
FIG. 4 is photographic images of one embodiment of image processing results using a plurality of masks.

FIG. 4 is photographic images of one embodiment of image processing results using a plurality of masks.

As shown in FIG. 4, from top to bottom, there are a content image and two masks of the content image, a texture image and two masks of the texture image, and an optimized image are shown in turn. Two masks are applied to FIG. 4, and the two masks represent two object types (e.g., a flower and a vase), a white part of a first mask represents a part where a flower is located, and a white part of a second mask represents a part where a vase is located.

In a combination of FIGS. 3 and 4, it can be seen that distorted petals (except for the flowers and vases) in the optimized image are significantly reduced with the increase of the masks. By use of masks, a calculation of a flower in the optimized image is based on a flower part of the texture image, and a calculation of a remaining part of the optimized image is based on remaining part of the texture image, which ensures spatial pixel isolation and gives optimized image more orientation.

Figure 5:
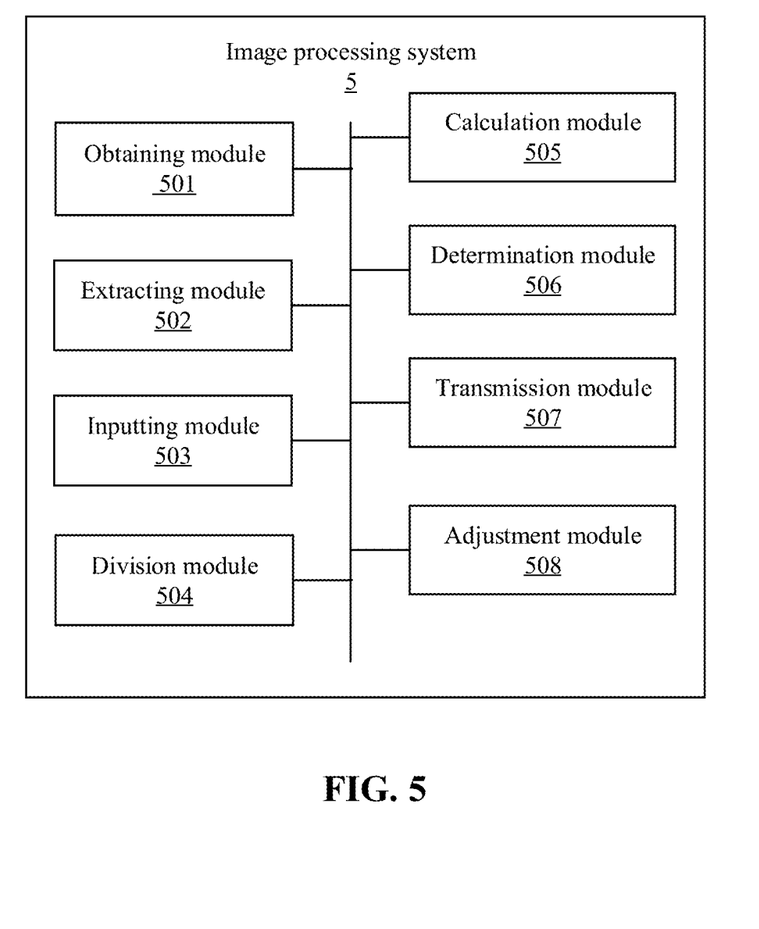
FIG. 5 is a block diagram of one embodiment of an image processing system.

FIG. 5 is a block diagram of one embodiment of an image processing system.

In some embodiments, an image processing system 5 runs in an electronic device. The image processing system 5 may include a plurality of functional modules including program code segments. Program codes of each of the program code segments in the image processing system 5 may be stored in a memory and executed by at least one processor to process images (as described in detail in FIG. 1).

In one embodiment, the image processing system 5 includes a plurality of functional modules according to functions performed thereby. The plurality of functional modules may include an obtaining module 501, an extracting module 502, an inputting module 503, a division module 504, a calculation module 505, a determination module 506, a transmission module 507, and an adjustment module 508. A module refers to a series of computer program code, which are stored in a memory and can be executed by at least one processor, and are capable of performing corresponding functions. In this embodiment, functions of each of the modules are described in detail in the following embodiments.

The obtaining module 501 is configured to obtain a content image, a texture image, and a to-be-optimized image.

In one embodiment, contents of the to-be-optimized image are consistent with contents of the content image. The to-be-optimized image is an image that needs to be texture-converted according to the texture image.

The extracting module 502 is configured to extract a first object mask of the texture image and a second object mask of the to-be-optimized image.

The first object mask of the texture image and the second object mask of the to-be-optimized image may be extracted in various manners. The various manners may include a manual drawing manner by using masking software, or an automatic generation manner by utilizing some pre-trained models.

The first object mask can draw an object outline of the texture image, and the first object mask can distinguish which part of the texture image belongs to an object area, and which part belongs to a background area. Similarly, the second object mask can draw an object outline of the to-be-optimized image, and the second object mask can distinguish which part of the to-be-optimized image belongs to an object area, and which part belongs to a background area.

The inputting module 503 is configured to input the content image, the texture image, the to-be-optimized image, the first object mask, and the second object mask into an image recognition model, and obtain a first content matrix corresponding to the content image, a first texture matrix corresponding to the texture image, a second content matrix and a second texture matrix corresponding to the to-be-optimized image, a first mask matrix corresponding to the first object mask, and a second mask matrix corresponding to the second object mask.

In one embodiment, the content image may be input into the image recognition model, and a matrix, which is denoted as the first content matrix corresponding to the content image, is output by a content layer of the image recognition model, the content layer uses Relu31 function. The texture image may be input into the image recognition model, and a matrix, which is denoted as the first texture matrix corresponding to the texture image, is output by a texture layer of the image recognition model, the texture layer uses Relu41 function. The first object mask of the texture image may be input into the image recognition model, and a matrix, which is denoted as the first mask matrix, is output by the texture layer of the image recognition model. In one embodiment, the first mask matrix can be a high dimensional matrix of 0 and 1, where 0 represents the background area in the texture image, and 1 represents the object area in the texture image.

The to-be-optimized image may be input into the image recognition model, and a matrix, which is denoted as the second content matrix corresponding to the to-be-optimized image, is output by the content layer of the image recognition model, and a matrix, which is denoted as the second texture matrix corresponding to the to-be-optimized image, is output by the texture layer of the image recognition model. The second object mask of the to-be-optimized image may be input into the image recognition model, and a matrix, which is denoted as the second mask matrix, is output by the texture layer of the image recognition model. In one embodiment, the second mask matrix can be a high dimensional matrix of 0 and 1, where 0 represents the background area in the to-be-optimized image, and 1 represents the object area in the to-be-optimized image.

The division module 504 is configured to divide the first texture matrix into a plurality of first sub-matrices, and the second texture matrix into a plurality of second sub-matrices.

A size of each sub-matrix may be preset. According to the preset size, the first texture matrix is divided into a plurality of first sub-matrices having the same size, and the second texture matrix is also divided into a plurality of second sub-matrices having the same size.

In one embodiment, the first content matrix may be defined as $\Phi^c(x_c)$, the second content matrix may be defined as $\Phi^c(x)$, the first texture matrix may be defined as $\Phi^s(x_s)$, and the second texture matrix may be defined as $\Phi^s(x)$. The $\Phi^s(x_s)$ and $\Phi^s(x)$ can be divided into a plurality of small matrices along the H, W space. For example, a matrix of H*W*C is divide into (H−3)×(w−3) small matrices of 3*3*C every 3 pixels, and a division of the i-th $\Phi^s(x_s)$ is represented as $\Psi_i(\Phi^s(x_s))$(e.g., the first sub-matrix). Similarly, a division of i-th $\Phi^s(x)$ is represented as $\Psi_i(\Phi^s(x))$ (e.g., the second sub-matrix).

The calculation module 505 is configured to calculate object loss and background loss according to the plurality of first sub-matrices, the plurality of second sub-matrices, the first mask matrix, and the second mask matrix, and calculate texture loss according to the object loss and the background loss.

According to the first mask matrix, the plurality of first sub-matrices is divided into two parts: a matrix belonging to an object area and a matrix belonging to a background area. Similarly, according to the second mask matrix, the plurality of second sub-matrices is divided into two parts: a matrix belonging to an object area and a matrix belonging to a background area.

The object loss is calculated by performing a difference calculation between the matrix belonging to the object area of the plurality of first sub-matrices and the matrix belonging to the object area of the plurality of second sub-matrices. The background loss is calculated by performing a logical AND calculation between the matrix belonging to the background area of the plurality of first sub-matrices and the matrix belonging to the background area of the plurality of second sub-matrices.

In one embodiment, the calculation module 505 is further configured to calculate content loss according to the first content matrix and the second content matrix.

In one embodiment, the content loss can be calculated using a formula of:

$$E_{content}=(\Phi^c(x)-\Phi^c(x_c))^2$$

Where $E_{content}$ represents the content loss, $\Phi^c(x)$ represents the second content matrix, and $\Phi^c(x_c)$ represents the first content matrix.

The determination module 506 is configured to determine a total loss according to the texture loss and the content loss.

The total loss can be calculated using a formula of:

$$E=E_{content}+E_{style}$$

Where E represents the total loss, $E_{content}$ represents the content loss, and $E_{style}$ represents the texture loss.

The total loss is a calculated initial value, and during the image processing, the total loss also needs to be continuously optimized until convergence.

The transmission module 507 is configured to transmit the total loss to the image recognition model by using a gradient descent algorithm, and obtain pixel loss of each pixel of the to-be-optimized image.

The adjustment module 508 is configured to adjust a value of each pixel of the to-be-optimized image to minimize the total loss according to the pixel loss.

The obtaining module 501 is further configured to obtain an updated to-be-optimized image.

In the process of optimization, a gradient descent algorithm (e.g., Stochastic Gradient Descent) may be used to transmit the total loss to the image recognition model, and pixel loss of each pixel of the to-be-optimized image can be obtained. According to the pixel loss, value of each pixel of the to-be-optimized image is adjusted to minimize the total loss, and an optimized image is obtained. The purpose of transmitting the total loss to the image recognition model is to adjust the value of each pixel of the to-be-optimized image.

In the process of optimizing the total loss, the content loss may gradually increase from 0, and the texture loss may gradually decrease correspondingly. When a sum (e.g., the total loss) of the content loss and the texture loss is the smallest, the optimization of the to-be-optimized image is finished and an optimized image is obtained.

The optimized image shows contents of the content image and texture of the texture image.

By use of a mask, the calculation of an object area of the optimized image is based on an object area of the texture image, and the calculation of background area of the optimized image is based on background area of the texture image. Therefore, the pixel isolation in the space is guaranteed, so that the optimized image has more orientation.

In terms of area controls of a texture conversion, the present disclosure uses a mask to artificially control an area selection of texture conversion, thus accuracy and speed can be freely switched. The image recognition model generated by the mask definition is compared to an original texture generation model, the image recognition model is better in content control, the optimized image based on the image recognition model has less redundant content, less computational resource is needed for computer computing, and it can be calculated in parallel. Compared to the original texture generation model, the image recognition model can produce more accurate and more reasonable images.

In one embodiment, the calculation of the object loss and the background loss according to the plurality of first sub-matrices, the plurality of second sub-matrices, the first mask matrix, and the second mask matrix includes: determining sub-matrices in an object area of the plurality of first sub-matrices as a first object matrix, and sub-matrices in a background area of the plurality of first sub-matrices as a first background matrix, based on the first mask matrix; determining sub-matrices in an object area of the plurality of second sub-matrices as a second object matrix, and sub-matrices in a background area of the plurality of second sub-matrices as a second background matrix, based on the second mask matrix; calculating the object loss according to the first object matrix and the second object matrix; calculating the background loss according to the first background matrix and the second background matrix.

In one embodiment, the calculation module 505 is further configured to calculate the texture loss according to a formula of:

$$E_{style} = \Sigma_{n=1}^{2} \Sigma_{i=1}^{mn} (\Psi_i(\Phi^s(x_n)) - (\Psi_{N_n N_n(i)}(\Phi^s(x_{ns})))^2.$$

Where $E_{style}$ represents the texture loss, $\Psi_i(\Phi^s(x_1))$ represents the first object matrix, $\Psi_{N_1 N_1(i)}(\Phi^s(x_{1S}))$ represents the second object matrix, $\Psi_i(\Phi^s(x_2))$ represents the first background matrix, and $\Psi_{N_2 N_2(i)}(\Phi^s(x_{2s}))$ represents the second background matrix.

$N_n N_n(i)$ represents an index value of the second object matrix or the second background matrix, an angular distance between the second object matrix or the second background matrix and $\Psi_i(\Phi^s(x_n))$ is the smallest distance.

$$N_n N_n(i) = \text{arg}min_{j=1,\ldots mn_s} \frac{\Psi_i(\Phi^s(x_n)) * \Psi_j(\Phi^s(x_{ns}))}{|\Psi_i(\Phi^s(x_n))| * |\Psi_j(\Phi^s(x_{ns}))|}.$$

And $mn_s$ represents a number of the second sub-matrices.

This embodiment is applicable to a single mask. After the first object matrix and the second object matrix are obtained, the first object matrix may be compared with the second object matrix, to obtain a difference (e.g., the object loss). After the first background matrix and the second background matrix are obtained, the first background matrix may be compared with the second background matrix, to obtain a difference (e.g., the background loss). Finally a sum of the object loss and the background loss may be determined to be the texture loss.

In another embodiment, if there are a plurality of the first object masks and a plurality of the second object masks, object types represented by the plurality of the first object masks are the same as object types represented by the plurality of the second object masks.

Each of the object masks represents an object type. For example, a first object mask may be a mask representing a first object type (e.g., a flower) in a texture image, or the first object mask may be a mask representing a second object type (e.g., a vase) in the texture image. A second object mask may be a mask representing the first object type (e.g., a flower) in a to-be-optimized image, or the second object mask may be a mask representing the second object type (e.g., a vase) in the to-be-optimized image. Object types represented by the first object mask are the same as object types represented by the second object mask. For example, the first object mask can represent two object types: a flower and a vase, the second object mask also represents two object types: a flower and a vase.

In one embodiment, the number of the object types represented by the object masks may also be three, four, or more, which is not limited in the embodiments of the present disclosure. After each of the object masks is input to the image recognition model, a mask matrix corresponding to the object mask is obtained. Accordingly, under the condition that there are a plurality of object masks, a plurality of mask matrices can be generated, and the number of the first object masks is the same as the number of the second object masks, and the number of the first mask matrices is also the same as the number of the second mask matrices.

In one embodiment, the calculation of the object loss and the background loss according to the plurality of first sub-matrices, the plurality of second sub-matrices, the first mask matrix and the second mask matrix, and the calculation of texture loss according to the object loss and the background loss includes: determining sub-matrices in an object area of the plurality of first sub-matrices as a first object matrix, and sub-matrices in a background area of the plurality of first sub-matrices as a first background matrix, according to the first mask matrices; determining sub-matrices in an object area of the plurality of second sub-matrices as a second object matrix, and sub-matrices in a background area of the plurality of second sub-matrices as a second background matrix, according to the second mask matrices; determining object types represented by the plurality of the first object masks and the plurality of the second object masks; calculating the object loss corresponding to each of the object types according to the first object matrix and the second object matrix corresponding to the each of the object types; calculating the background loss according to the first background matrix and the second background matrix; calculating the texture loss according to the object loss corresponding to all of the object types and the background loss.

The above embodiment is applicable to a plurality of masks. When calculating the object loss, it is necessary to separately calculate an object loss corresponding to each object type according to the object type. Taking two masks as an example, the two masks correspond to two object types, and the texture loss can be calculated using a formula of:

$$E_{style} = \Sigma_{n=1}^{3} \Sigma_{i=1}^{mn} (\Psi_i(\Phi^s(x_n)) - (\Psi_{N_n N_n(i)}(\Phi^s(x_{ns})))^2.$$

Where $E_{style}$ represents the texture loss, and when n is equal to 1 or 2, $\Psi_i(\Phi^s(x_n))$ represents two first object matrices, including the first object matrix representing the first object type and the first object matrix representing the second object type. The $\Psi_{N_n N_n(i)}(\Phi^s(x_{ns}))$ represents two second object matrices, including the second object matrix representing the first object type and the second object matrix representing the second object type. When n is equal to 3, $\Psi_i(\Phi^s(x_3))$ represents the first background matrix, and $\Psi_{N_3 3(i)}(\Phi^s(x_{3s}))$ represents the second background matrix.

$N_n N_n(i)$ represents an index value of the second object matrix or the second background matrix, an angular distance between the second object matrix or the second background matrix and $\Psi_i(\Phi^s(x_n))$ is the smallest distance.

$$N_n N_n(i) = \text{arg}min_{j=1,\ldots mn_s} \frac{\Psi_i(\Phi^s(x_n)) * \Psi_j(\Phi^s(x_{ns}))}{|\Psi_i(\Phi^s(x_n))| * |\Psi_j(\Phi^s(x_{ns}))|}.$$

And $mn_s$ represents the number of the second sub-matrices.

In one embodiment, under the condition that there are a plurality of the texture images, the image processing system further includes a saving module and a establishing module.

The saving module is configured to save, for each of the object types, a plurality of first object matrices corresponding to the plurality of the texture images as a model format file.

The establishing module is configured to establish a texture database according to the model format files corresponding to all of the object types.

In one embodiment, a texture conversion algorithm is utilized to perform a calculation between sub-matrices of the to-be-optimized image and sub-matrices of the texture image, and the texture conversion algorithm is not directly utilized to perform a calculation between the to-be-optimized image and the texture image. Therefore, it is more straightforward to store sub-matrices than to store images, and the computational time in conversion can be reduced significantly, no result of all output layers is needed, and the memory space is saved.

In one embodiment, the texture database can be a model format file, and there is no entire image. The plurality of first object matrices corresponding to an object type can be saved as a model format file. A number of the model format files are the same as a number of the object types. When a new texture image needs to be added into the texture database, a method similar to that described above can be performed to input the new texture image into the image recognition model, and a new sub-matrix is added into the model format file of the texture database.

When a new to-be-optimized image is processed later, the model format file can be directly obtained from the texture database, thus a diversity of generated result images is increased. Since images generated by texture conversion are based on a plurality of the texture images in the texture database, the generated result image will not be very similar to a texture image. In addition, since the texture database is pre-calculated by the image recognition model, the texture conversion algorithm can directly use the pre-calculated results without recalculation in the process of texture conversion, thus, image generation time can be reduced and image processing efficiency is improved.

In one embodiment, the image recognition model is a Visual Geometry Group Network (VGG) series model, the image recognition model comprises VGG16 model or VGG19 model.

FIG. 2 is photographic images of one embodiment of image processing results without using a mask.

As shown in FIG. 2, from left to right, there are a content image, a texture image, and an optimized image shown in turn. In one embodiment of images shown in FIG. 2, no mask is used during image processing. As an object area is not controlled, the optimized image has poor image effect.

FIG. 3 is photographic images of one embodiment of image processing results using a single mask.

As shown in FIG. 3, from top to bottom, there are a content image and its mask, a texture image and its mask, and an optimized image are shown in turn. A single mask is applied to FIG. 3, and the single mask represents an object type (e.g., a flower) in FIG. 3, a white part of the single mask represents a part where a flower is located.

FIG. 4 is photographic images of one embodiment of image processing results using a plurality of masks.

As shown in FIG. 4, from top to bottom, there are a content image and its two masks, a texture image and its two masks, and an optimized image are shown in turn. Two masks are applied to FIG. 4, and the two masks represent two object types (e.g., a flower and a vase), a white part of a first mask represents a part where a flower is located, and a white part of a second mask represents a part where a vase is located.

In a combination of FIGS. 3 and 4, it can be seen that distorted petals (except for the flowers and vases) in the optimized image are significantly reduced with the increase of the masks. By use of masks, a calculation of a flower in the optimized image is based on a flower part of the texture image, and a calculation of a remaining part of the optimized image is based on remaining part of the texture image, which ensures spatial pixel isolation and makes optimized image more oriented.

Figure 6:
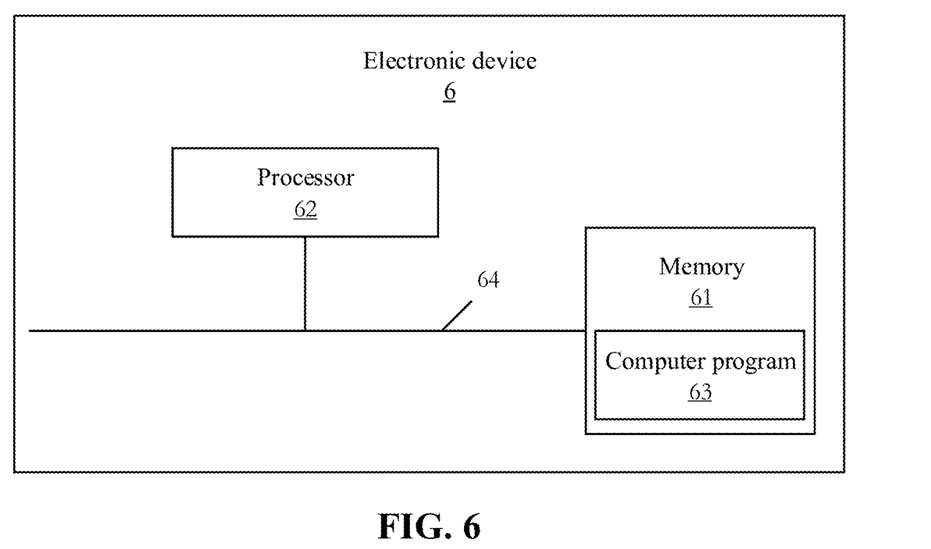
FIG. 6 is a block diagram of one embodiment of an electronic device utilizing the method of FIG. 1.

FIG. 6 is a block diagram of one embodiment of an electronic device utilizing the method of FIG. 1.

The electronic device 6 includes a memory 61, at least one processor 62, a computer program 63 stored in the memory 61 and operable on the at least one processor 62, and at least one communication bus 64.

It will be understood by those skilled in the art that FIG. 6 shows an example of the electronic device 6, it does not constitute a limitation on the electronic device 6, other examples may include more or less components than those illustrated, or may combine certain components, or have different components. The electronic device 6 may also include input and output devices, network access devices, and the like.

The at least one processor 62 may be a central processing unit (CPU), or another general-purpose processor, a digital signal processor (DSP), or an application specific integrated circuit (ASIC), a Field-Programmable Gate Array (FPGA) or other programmable logic device, discrete gate or transistor logic device, discrete hardware components, and the like. The at least one processor 62 may be a microprocessor or any conventional processor or the like. The at least one processor 62 is a control center of the electronic device 6, and connects various parts of the entire electronic device 6 by using various interfaces and lines.

The memory 61 can be used to store the computer program 63 and/or modules/units by running or executing computer programs. Data within the memory 61 implements various functions of the electronic device 6. The memory 61 may mainly include a storage program area and a storage data area, wherein the storage program area may store an operating system, an application required for at least one function (such as a sound playing function, an image playing function, etc.), and the like. Data created by the use of the electronic device 6 is also stored. In addition, the memory 61 may include a non-volatile memory such as a hard disk, a memory, a plug-in hard disk, a smart memory card (SMC), and a secure digital (SD) card, flash card, at least one disk storage device, flash device, or other non-volatile solid state storage device.

Combined with FIG. 1, the memory 61 in the electronic device 6 stores a plurality of instructions to implement an image processing method, and when the memory 61 is executed by the at least one processor 62, the at least one processor 62 is caused to: obtain a content image, a texture image, and a to-be-optimized image, contents of the to-be-optimized image being consistent with contents of the content image; extract a first object mask of the texture image and a second object mask of the to-be-optimized image; input the content image, the texture image, the to-be-optimized image, the first object mask, and the second object mask into an image recognition model, and obtain a first content matrix corresponding to the content image, a first texture matrix corresponding to the texture image, a second content matrix and a second texture matrix corresponding to the to-be-optimized image, a first mask matrix corresponding to the first object mask, and a second mask matrix corresponding to the second object mask; divide the first texture matrix into a plurality of first sub-matrices, and the second texture matrix into a plurality of second sub-matrices; calculate object loss and background loss according to the plurality of first sub-matrices, the plurality of second sub-matrices, the first mask matrix, and the second mask matrix, and calculate texture loss according to the object loss and the background loss; calculate content loss according to the first content matrix and the second content matrix; determine a total loss according to the texture loss and the content loss; transmit the total loss to the image recognition model by using a gradient descent algorithm, and obtain pixel loss of each pixel of the to-be-optimized image; adjust a value of each pixel of the to-be-optimized image to minimize the total loss according to the pixel loss, and obtain an optimized image.

In at least one embodiment, the at least one processor to calculate the object loss and the background loss according to the plurality of first sub-matrices, the plurality of second sub-matrices, the first mask matrix, and the second mask matrix includes determine sub-matrices in an object area of the plurality of first sub-matrices as a first object matrix, and sub-matrices in a background area of the plurality of first sub-matrices as a first background matrix, based on the first mask matrix; determine sub-matrices in an object area of the plurality of second sub-matrices as a second object matrix, and sub-matrices in a background area of the plurality of second sub-matrices as a second background matrix, based on the second mask matrix; calculate the object loss according to the first object matrix and the second object matrix; calculate the background loss according to the first background matrix and the second background matrix.

In at least one embodiment, the at least one processor further calculate the texture loss according to a formula of:

$$E_{style} = \Sigma_{n=1}^{2} \Sigma_{i=1}^{mn} (\Psi_i(\Phi^s(x_n)) - (\Psi_{N_nN_n(i)}(\Phi^s(x_{ns})))^2$$

Wherein $E_{style}$ represents the texture loss, $\Psi_i(\Phi^s(x_1))$ represents the first object matrix, $\Psi_{N_nN_1(i)}(\Phi^s(x_{1s}))$ represents the second object matrix, $\Psi_i(\Phi^s(x_2))$ represents the first background matrix, and $\Psi_{N_nN_2(i)}(\Phi^s(x_{2s}))$ represents the second background matrix.

Wherein $N_nN_n(i)$ represents an index value of the second object matrix or the second background matrix, an angular distance between the second object matrix or the second background matrix and $\Psi_i(\Phi^s(x_n))$ is smallest distance.

$$N_nN_n(i) = \mathrm{arg}min_{j=1,\ldots mn_s} \frac{\Psi_i(\Phi^s(x_n)) * \Psi_j(\Phi^s(x_{ns}))}{|\Psi_i(\Phi^s(x_n))| * |\Psi_j(\Phi^s(x_{ns}))|}.$$

And $mn_s$ represents a number of the second sub-matrices.

In at least one embodiment, when there are a plurality of the first object masks and a plurality of the second object masks, object types represented by the plurality of the first object masks are the same as object types represented by the plurality of the second object masks.

In at least one embodiment, the at least one processor to calculate the object loss and the background loss according to the plurality of first sub-matrices, the plurality of second sub-matrices, the first mask matrix, and the second mask matrix, and calculate texture loss according to the object loss and the background loss includes: determine sub-matrices in an object area of the plurality of first sub-matrices as a first object matrix, and sub-matrices in a background area of the plurality of first sub-matrices as a first background matrix, according to the first mask matrices; determine sub-matrices in an object area of the plurality of second sub-matrices as a second object matrix, and sub-matrices in a background area of the plurality of second sub-matrices as a second background matrix, according to the second mask matrices; determine object types represented by the plurality of the first object masks and the plurality of the second object masks; calculate the object loss corresponding to each of the object types according to the first object matrix and the second object matrix corresponding to the each of the object types; calculate background loss according to the first background matrix and the second background matrix; calculate the texture loss according to the object loss corresponding to all of the object types and the background loss.

In at least one embodiment, where there is a plurality of the texture images, the at least one processor further save, for each of the object types, a plurality of first object matrices corresponding to the plurality of the texture images as a model format file; establish a texture database according to the model format files corresponding to all object types.

In at least one embodiment, the image recognition model is a Visual Geometry Group Network (VGG) series model, the image recognition model comprises VGG16 model or VGG19 model.

For details, the description of the related steps in the corresponding embodiment of FIG. 1 for the specific implementation of the above-mentioned instructions by the at least one processor 62 is previously given.

The modules/units integrated by the electronic device 6, if implemented in the form of software functional units as separate products, may be stored in a computer readable storage medium. Based on such understanding, the present disclosure implements all or part of the processes in the foregoing embodiments, and may also be completed by a computer program to instruct related hardware. The computer program may be stored in a computer readable storage medium. The steps of the various method embodiments described above may be implemented when the program is executed by the processor. Wherein, the computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, and a read-only memory (ROM).

In the several embodiments provided by the present disclosure, it should be understood that the disclosed system, apparatus, and method may be implemented in other manners. For example, the device embodiments described above are merely illustrative. For example, the division of the modules is only a logical function division, and the actual implementation may have another manner of division.

The modules described as separate components may or may not be physically separated, and the components displayed as modules may or may not be physical units, that is, may be located in one place, or may be distributed in multiple network units. Some or all of the modules may be selected according to actual needs to achieve the purpose of the disclosure.

In addition, each functional module in each embodiment of the present disclosure may be integrated into one processing unit, or each unit may exist as a standalone unit, or two or more units may be integrated into one unit. The above integrated unit can be implemented in the form of hardware or in the form of hardware plus software function modules.

It is apparent to those skilled in the art that the present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims instead all changes in the meaning and scope of equivalent elements are included in the present disclosure. Any accompanying drawings in the claims should not be construed as limiting the claim. In addition, it is to be understood that the word "including" does not exclude other elements or steps. A plurality of units or devices recited in the system claims can also be implemented by a unit or device by software or hardware. The particular ordering of words does not denote any particular order.

It should be noted that the above embodiments are only for explaining the technical solutions of the present disclosure and are not intended to be limiting, and the present disclosure describes preferred embodiments. Modifications or equivalents can be made without departing from the spirit and scope of the present disclosure.

What is claimed is:

1. An image processing method, comprising:
obtaining a content image, a texture image, and a to-be-optimized image, contents of the to-be-optimized image is consistent with contents of the content image;
extracting a first object mask of the texture image and a second object mask of the to-be-optimized image;
inputting the content image, the texture image, the to-be-optimized image, the first object mask, and the second object mask into an image recognition model;
obtaining a first content matrix corresponding to the content image, a first texture matrix corresponding to the texture image, a second content matrix and a second texture matrix corresponding to the to-be-optimized image, a first mask matrix corresponding to the first object mask, and a second mask matrix corresponding to the second object mask by the image recognition model;
dividing the first texture matrix into a plurality of first sub-matrices, and the second texture matrix into a plurality of second sub-matrices;
calculating object loss and background loss according to the plurality of first sub-matrices, the plurality of second sub-matrices, the first mask matrix, and the second mask matrix, and calculating texture loss according to the object loss and the background loss;
calculating content loss according to the first content matrix and the second content matrix;
determining a total loss according to the texture loss and the content loss;
transmitting the total loss to the image recognition model by using a gradient descent algorithm, and obtaining pixel loss of each pixel of the to-be-optimized image;
adjusting a value of each pixel of the to-be-optimized image to minimize the total loss according to the pixel loss, and obtaining an optimized image.

2. The image processing method of claim 1, wherein the method of calculating the object loss and the background loss according to the plurality of first sub-matrices, the plurality of second sub-matrices, the first mask matrix, and the second mask matrix comprises:
determining sub-matrices in an object area of the plurality of first sub-matrices as a first object matrix, and sub-matrices in a background area of the plurality of first sub-matrices as a first background matrix, based on the first mask matrix;
determining sub-matrices in an object area of the plurality of second sub-matrices as a second object matrix, and sub-matrices in a background area of the plurality of second sub-matrices as a second background matrix, based on the second mask matrix;
calculating the object loss according to the first object matrix and the second object matrix;
calculating the background loss according to the first background matrix and the second background matrix.

3. The image processing method of claim 2, the method further comprising:
calculating the texture loss according to a formula of:

$$E_{style} = \sum_{n=1}^{2} \sum_{i=1}^{m_n} (\Psi_i(\Phi^s(x_n)) - (\Psi_{N_n N_n(i)}(\Phi^s(x_{ns})))^2$$

wherein $E_{style}$ represents the texture loss, $\Psi_i(\Phi^s(x_1))$ represents the first object matrix, $\Psi_{N_1 N_1(i)}(\Phi^s(x_{1s}))$ represents the second object matrix, $\Psi_i(\Phi^s(x_2))$ represents the first background matrix, $\Psi_{N_2 N_2(i)}(\Phi^s(x_{2s}))$ represents the second background matrix;
wherein $N_n N_n(i)$ represents an index value of the second object matrix or the second background matrix, an angular distance between the second object matrix or the second background matrix and $\Psi_i(\Phi^s(x_n))$ is the smallest;
wherein $$N_n N_n(i) = \arg\min_{j=1,\dots m n_s} \frac{\Psi_i(\Phi^s(x_n)) * \Psi_j(\Phi^s(x_{ns}))}{|\Psi_i(\Phi^s(x_n))| * |\Psi_j(\Phi^s(x_{ns}))|},$$

and $mn_s$ represents a number of the second sub-matrices.

4. The image processing method of claim 1, wherein when there are a plurality of the first object masks and a plurality of the second object masks, object types represented by the plurality of the first object masks are the same as object types represented by the plurality of the second object masks.

5. The image processing method of claim 4, wherein the method of calculating the object loss and the background loss according to the plurality of first sub-matrices, the plurality of second sub-matrices, the first mask matrix, and the second mask matrix, and calculating texture loss according to the object loss and the background loss comprises:
determining sub-matrices in an object area of the plurality of first sub-matrices as a first object matrix, and sub-matrices in a background area of the plurality of first sub-matrices as a first background matrix, according to the first mask matrices;
determining sub-matrices in an object area of the plurality of second sub-matrices as a second object matrix, and sub-matrices in a background area of the plurality of second sub-matrices as a second background matrix, according to the second mask matrices;
determining the object types represented by the plurality of the first object masks and the plurality of the second object masks;
calculating the object loss corresponding to each of the object types according to the first object matrix and the second object matrix corresponding to the each of the object types;
calculating the background loss according to the first background matrix and the second background matrix;
calculating the texture loss according to the object loss corresponding to all of the object types and the background loss.

6. The image processing method of claim 4, wherein there are a plurality of the texture images, and the method further comprises:
   saving, for each of the object types, a plurality of first object matrices corresponding to the plurality of the texture images as a model format file;
   establishing a texture database according to the model format files corresponding to all of the object types.

7. The image processing method of claim 1, wherein the image recognition model is a Visual Geometry Group Network (VGG) series model, the image recognition model comprises a VGG16 model or a VGG19 model.

8. An electronic device, comprising:
   at least one processor; and
   a storage device storing one or more programs which when executed by the at least one processor, causes the at least one processor to:
   obtain a content image, a texture image, and a to-be-optimized image, contents of the to-be-optimized image is consistent with contents of the content image;
   extract a first object mask of the texture image and a second object mask of the to-be-optimized image;
   input the content image, the texture image, the to-be-optimized image, the first object mask, and the second object mask into an image recognition model;
   obtain a first content matrix corresponding to the content image, a first texture matrix corresponding to the texture image, a second content matrix and a second texture matrix corresponding to the to-be-optimized image, a first mask matrix corresponding to the first object mask, and a second mask matrix corresponding to the second object mask by the image recognition model;
   divide the first texture matrix into a plurality of first sub-matrices, and the second texture matrix into a plurality of second sub-matrices;
   calculate object loss and background loss according to the plurality of first sub-matrices, the plurality of second sub-matrices, the first mask matrix, and the second mask matrix, and calculate texture loss according to the object loss and the background loss;
   calculate content loss according to the first content matrix and the second content matrix;
   determine a total loss according to the texture loss and the content loss;
   transmit the total loss to the image recognition model by using a gradient descent algorithm, and obtain pixel loss of each pixel of the to-be-optimized image;
   adjust a value of each pixel of the to-be-optimized image to minimize the total loss according to the pixel loss, and obtain an optimized image.

9. The electronic device of claim 8, wherein the at least one processor to calculate the object loss and the background loss according to the plurality of first sub-matrices, the plurality of second sub-matrices, the first mask matrix, and the second mask matrix comprises:
   determine sub-matrices in an object area of the plurality of first sub-matrices as a first object matrix, and sub-matrices in a background area of the plurality of first sub-matrices as a first background matrix, based on the first mask matrix;
   determine sub-matrices in an object area of the plurality of second sub-matrices as a second object matrix, and sub-matrices in a background area of the plurality of second sub-matrices as a second background matrix, based on the second mask matrix;
   calculate the object loss according to the first object matrix and the second object matrix;
   calculate the background loss according to the first background matrix and the second background matrix.

10. The electronic device of claim 9, wherein the at least one processor further to:
    calculate the texture loss according to a formula of:

$$E_{style} = \sum_{n=1}^{2} \sum_{i=1}^{m_n} (\Psi_i(\Phi^s(x_n)) - (\Psi_{N_n N_n(i)}(\Phi^s(x_{ns})))^2$$

wherein $E_{style}$ represents the texture loss, $\Psi_i(\Phi^s(x_1))$ represents the first object matrix, $\Psi_{N_1 N_1(i)}(\Phi^s(x_{1s}))$ represents the second object matrix, $\Psi_i(\Phi^s(x_2))$ represents the first background matrix, $\Psi_{N_2 N_2(i)}(\Phi^s(x_{2s}))$ represents the second background matrix;

wherein $N_n N_n(i)$ represents an index value of the second object matrix or the second background matrix, an angular distance between the second object matrix or the second background matrix and $\Psi_i(\Phi^s(x_n))$ is the smallest;

wherein:

$$N_n N_n(i) = \arg\min\nolimits_{j=1,\ldots\ mn_s} \frac{\Psi_i(\Phi^s(x_n)) * \Psi_j(\Phi^s(x_{ns}))}{|\Psi_i(\Phi^s(x_n))| * |\Psi_j(\Phi^s(x_{ns}))|}$$

and $mn_s$ represents a number of the second sub-matrices.

11. The electronic device of claim 8, wherein when there are a plurality of the first object masks and a plurality of the second object masks, object types represented by the plurality of the first object masks are the same as object types represented by the plurality of the second object masks.

12. The electronic device of claim 11, wherein the at least one processor to calculate the object loss and the background loss according to the plurality of first sub-matrices, the plurality of second sub-matrices, the first mask matrix, and the second mask matrix, and calculate texture loss according to the object loss and the background loss comprises:
    determine sub-matrices in an object area of the plurality of first sub-matrices as a first object matrix, and sub-matrices in a background area of the plurality of first sub-matrices as a first background matrix, according to a plurality of the first mask matrices;
    determine sub-matrices in an object area of the plurality of second sub-matrices as a second object matrix, and sub-matrices in a background area of the plurality of second sub-matrices as a second background matrix, according to a plurality of the second mask matrices;
    determine the object types represented by the plurality of the first object masks and the plurality of the second object masks;
    calculate the object loss corresponding to each of the object types according to the first object matrix and the second object matrix corresponding to the each of the object types;
    calculate the background loss according to the first background matrix and the second background matrix;
    calculate the texture loss according to the object loss corresponding to all of the object types and the background loss.

13. The electronic device of claim 11, wherein there are a plurality of the texture images, the at least one processor further to:
  save, for each of the object types, a plurality of first object matrices corresponding to the plurality of the texture images as a model format file;
  establish a texture database according to the model format files corresponding to all of the object types.

14. The electronic device of claim 8, wherein the image recognition model is a Visual Geometry Group Network (VGG) series model, the image recognition model comprises a VGG16 model or a VGG19 model.

15. A non-transitory storage medium having stored thereon instructions that, when executed by a processor of an electronic device, causes the electronic device to perform an image processing method, the method comprising:
  obtaining a content image, a texture image, and a to-be-optimized image, wherein contents of the to-be-optimized image is consistent with contents of the content image;
  extracting a first object mask of the texture image and a second object mask of the to-be-optimized image;
  inputting the content image, the texture image, the to-be-optimized image, the first object mask, and the second object mask into an image recognition model;
  obtaining a first content matrix corresponding to the content image, a first texture matrix corresponding to the texture image, a second content matrix and a second texture matrix corresponding to the to-be-optimized image, a first mask matrix corresponding to the first object mask, and a second mask matrix corresponding to the second object mask by the image recognition model;
  dividing the first texture matrix into a plurality of first sub-matrices, and the second texture matrix into a plurality of second sub-matrices;
  calculating object loss and background loss according to the plurality of first sub-matrices, the plurality of second sub-matrices, the first mask matrix, and the second mask matrix, and calculating texture loss according to the object loss and the background loss;
  calculating content loss according to the first content matrix and the second content matrix;
  determining a total loss according to the texture loss and the content loss;
  transmitting the total loss to the image recognition model by using a gradient descent algorithm, and obtaining pixel loss of each pixel of the to-be-optimized image;
  adjusting a value of each pixel of the to-be-optimized image to minimize the total loss according to the pixel loss, and obtaining an optimized image.

16. The non-transitory storage medium of claim 15, wherein the method of calculating the object loss and the background loss according to the plurality of first sub-matrices, the plurality of second sub-matrices, the first mask matrix, and the second mask matrix comprises:
  determining sub-matrices in an object area of the plurality of first sub-matrices as a first object matrix, and sub-matrices in a background area of the plurality of first sub-matrices as a first background matrix, based on the first mask matrix;
  determining sub-matrices in an object area of the plurality of second sub-matrices as a second object matrix, and sub-matrices in a background area of the plurality of second sub-matrices as a second background matrix, based on the second mask matrix;
  calculating the object loss according to the first object matrix and the second object matrix;
  calculating the background loss according to the first background matrix and the second background matrix.

17. The non-transitory storage medium of claim 16, the method further comprising:
  calculating the texture loss according to a formula of:

$$E_{style} = \sum_{n=1}^{2} \sum_{i=1}^{m_n} (\Psi_i(\Phi^s(x_n)) - (\Psi_{N_n N_n(i)}(\Phi^s(x_{ns}))))^2$$

wherein $E_{style}$ represents the texture loss, $\Psi_i(\Phi^s(x_1))$ represents the first object matrix, $\Psi_{N_1 N_1(i)}(\Phi^s(x_{1s}))$ represents the second object matrix, $\Psi_i(\Phi^s(x_2))$ represents the first background matrix, $\Psi_{N_2 N_2(i)}(\Phi^s(x_{2s}))$ represents the second background matrix;
  wherein $N_n N_n(i)$ represents an index value of the second object matrix or the second background matrix, an angular distance between the second object matrix or the second background matrix and $\Psi_i(\Phi^s(x_n))$ is the smallest;
  wherein $$N_n N_n(i) = \arg\min\nolimits_{j=1,\ldots\ mn_s} \frac{\Psi_i(\Phi^s(x_n)) * \Psi_j(\Phi^s(x_{ns}))}{|\Psi_i(\Phi^s(x_n))| * |\Psi_j(\Phi^s(x_{ns}))|}$$

and $mn_s$ represents a number of the second sub-matrices.

18. The non-transitory storage medium of claim 15, wherein when there are a plurality of the first object masks and a plurality of the second object masks, object types represented by the plurality of the first object masks are the same as object types represented by the plurality of the second object masks.

19. The non-transitory storage medium of claim 18, wherein the method of calculating the object loss and the background loss according to the plurality of first sub-matrices, the plurality of second sub-matrices, the first mask matrix, and the second mask matrix, and the calculating texture loss according to the object loss and the background loss comprises:
  determining sub-matrices in an object area of the plurality of first sub-matrices as a first object matrix, and sub-matrices in a background area of the plurality of first sub-matrices as a first background matrix, according to a plurality of the first mask matrices;
  determining sub-matrices in an object area of the plurality of second sub-matrices as a second object matrix, and sub-matrices in a background area of the plurality of second sub-matrices as a second background matrix, according to a plurality of the second mask matrices;
  determining the object types represented by the plurality of the first object masks and the plurality of the second object masks;
  calculating the object loss corresponding to each of the object types according to the first object matrix and the second object matrix corresponding to the each of the object types;
  calculating the background loss according to the first background matrix and the second background matrix;
  calculating the texture loss according to the object loss corresponding to all of the object types and the background loss.

20. The non-transitory storage medium of claim 18, wherein there are a plurality of the texture images, the method further comprising:

saving, for each of the object types, a plurality of first object matrices corresponding to the plurality of the texture images as a model format file;

establishing a texture database according to the model format files corresponding to all of the object types.

* * * * *